United States Patent [19]

Palatchy

[11] Patent Number: 5,018,768
[45] Date of Patent: May 28, 1991

[54] PIPE COUPLING HINGE
[75] Inventor: Josef Palatchy, Tiberias, Israel
[73] Assignee: Quikcoup, Incorporated, Pontaic, Mich.
[21] Appl. No.: 554,675
[22] Filed: Jul. 19, 1990
[51] Int. Cl.$^5$ ............................................. F16L 35/00
[52] U.S. Cl. .................................... 285/24; 285/112; 285/367; 285/420; 24/284
[58] Field of Search ............... 285/419, 365, 366, 367, 285/408, 409, 410, 420, 373, 24, 112; 24/279, 280, 282, 284, 285, 20 LS

[56] References Cited

U.S. PATENT DOCUMENTS

| | | | |
|---|---|---|---|
| 411,967 | 10/1889 | Rieseck | 24/279 |
| 1,928,316 | 9/1933 | Muto | 285/373 |
| 3,964,773 | 6/1976 | Stade et al. | 285/367 |
| 4,373,235 | 2/1983 | Korgaonkar | 285/373 X |
| 4,915,418 | 4/1990 | Palatchy | 285/112 X |

*Primary Examiner*—Dave W. Arola
*Assistant Examiner*—Heather Chun
*Attorney, Agent, or Firm*—Harness, Dickey & Pierce

[57] ABSTRACT

A pipe coupling for encircling and coupling aligned pipe ends is formed of aligned arcuate segments that are fastened together. The segments are hingedly connected together at adjacent ends by means of a hook formed on the end of one segment and a hook receiving loop formed on the corresponding end of the other segment. The loop forms an elongated rectangular opening defined by a pair of radially outwardly extending legs, that are joined to the segment and an axle connecting the legs. The hook has a similar cross section, but is loosely fitted within the opening. A depression is formed in the axle, at one leg, and a correspondingly aligned depression is formed in the segment wall adjacent the opposite leg. The hook has a projection which normally prevents the hook from withdrawal from the loop opening when the hook is pivoted relative to the opening. But, the hook is sufficiently loose in the opening so that the segments may be angled relative to each other to move the opposite corners of the hook into the depressions and, thereby, clear the projection relative to the opening for permitting withdrawal of the hook from the loop. A removable ring arranged around the axle, between its adjacent leg and the hook, normally prevents such relative movement, but is removable to permit such relative movement. The opposite ends of the segments are fastened together by a bolt. Thus, the segments may be stored separately and assembled together when desired, by interconnecting the hook and loop, or may be pre-assembled.

9 Claims, 2 Drawing Sheets

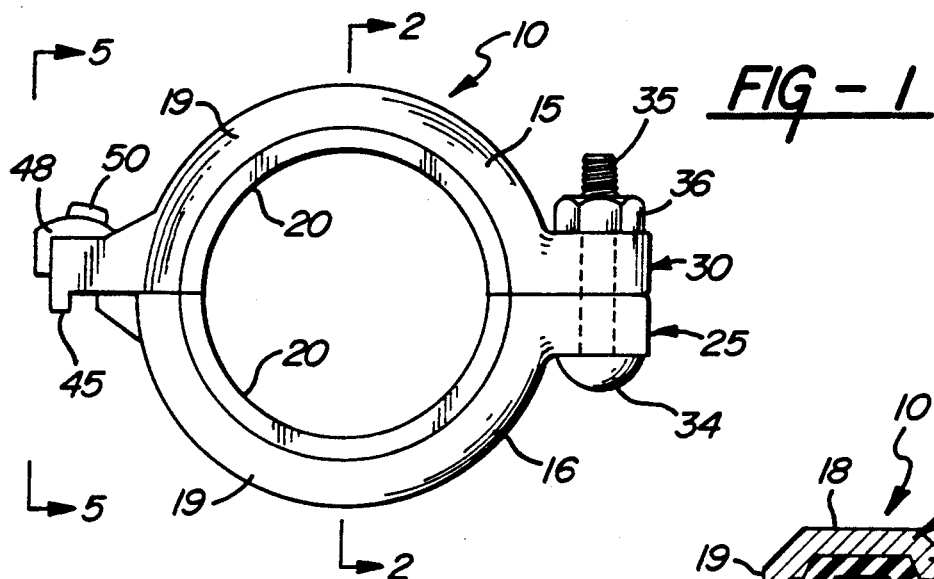
FIG-1
FIG-2
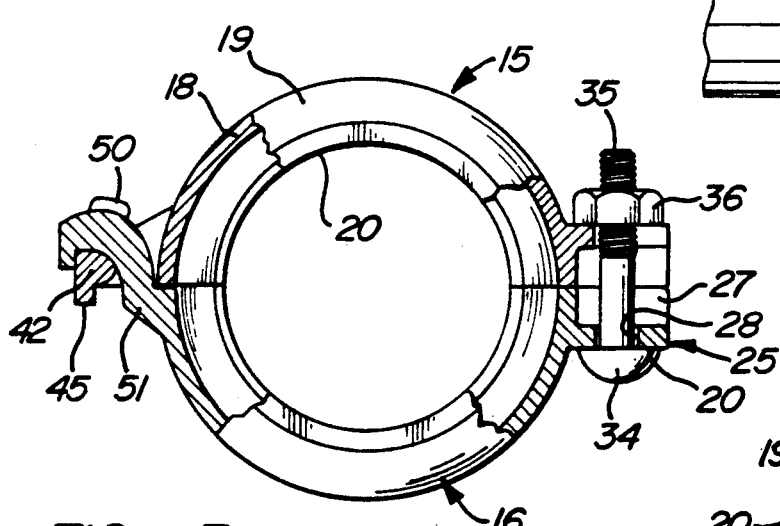
FIG-3
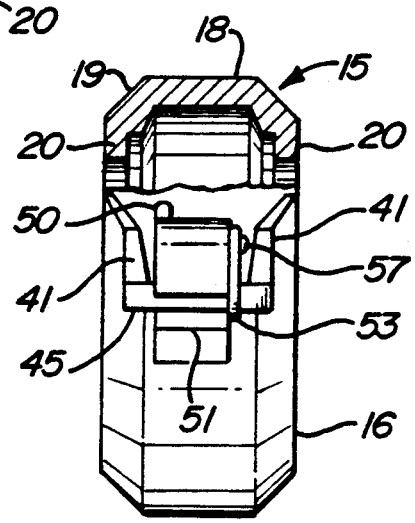
FIG-5

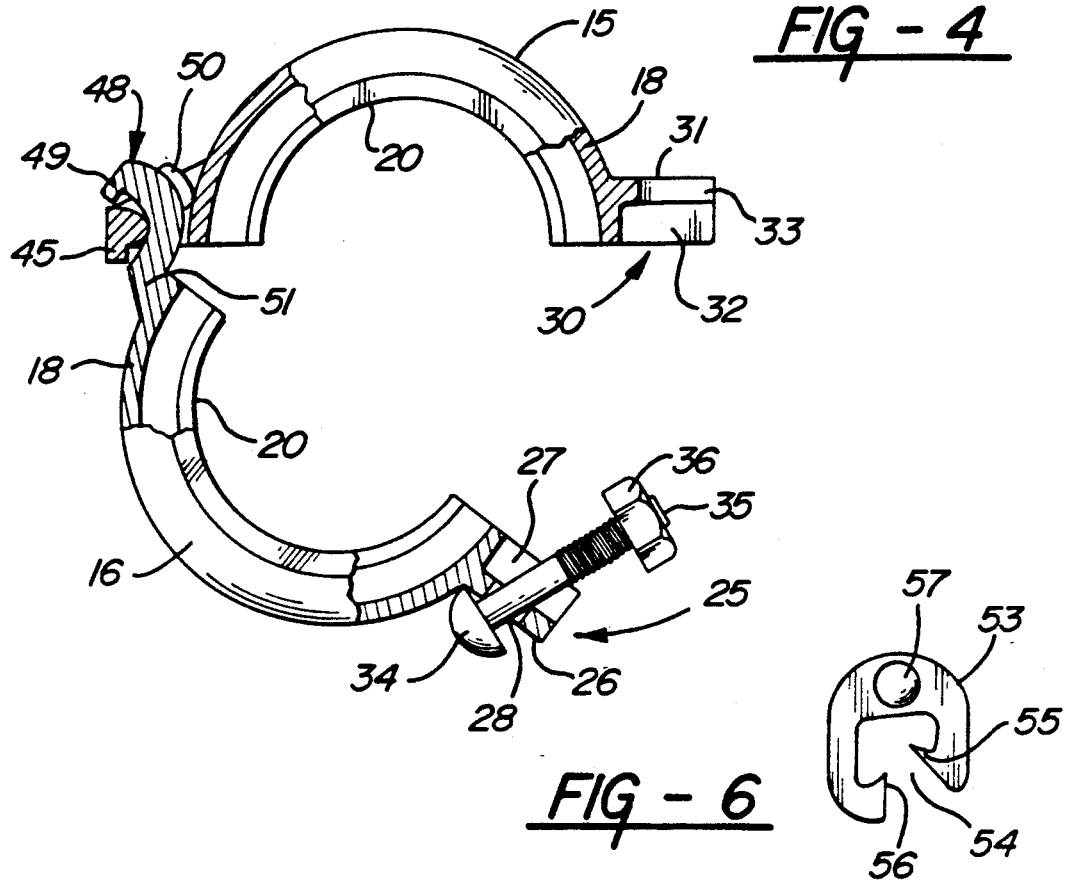
FIG-4
FIG-6
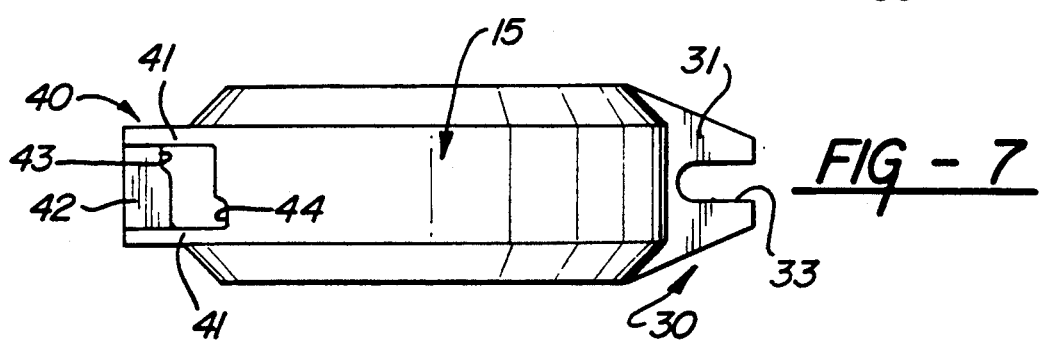
FIG-7
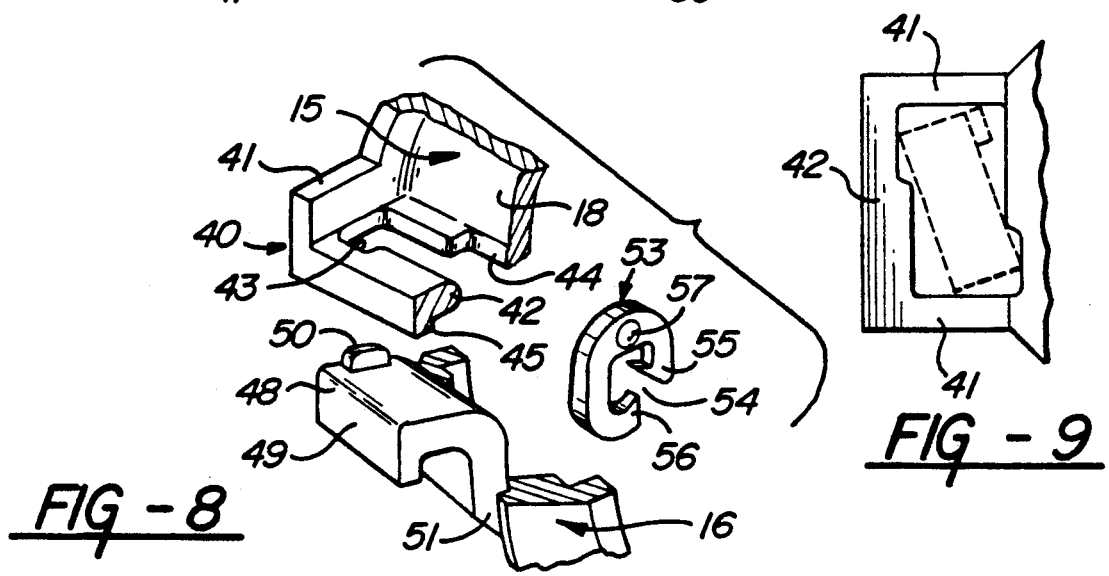
FIG-8
FIG-9

PIPE COUPLING HINGE

BACKGROUND OF INVENTION

This invention relates to a pipe coupling of the type formed of arcuate sections that are connected together to provide a circular casing which surrounds and couples a pair of adjacent pipe ends. Such a coupling is disclosed in my U.S. Patent Application Ser. No. 07/354,298 filed May 19, 1989, now U.S. Pat. No. 4,915,418 issued Apr. 10, 1990.

The type of coupling involved is typically formed of a pair of semi-circular or arcuate segments which have radially outwardly extending lugs formed on their opposite ends. The segments are aligned so that their corresponding lugs overlap and the pairs of overlapped lugs are fastened together with bolts and nuts or similar mechanical fasteners. In the coupling disclosed in my above patent, two adjacent segment ends are connected together by means of a hook and loop hinge construction. This permits the two segments to be stored and handled separately and assembled together whenever desired, such as on the job site, or by pre-assembling when desired. When the segments are assembled, they may be swung apart about their hinge and one segment may be positioned over the adjacent pipe ends and then the other segment swung into alignment with the first segment so that the segments may now be bolted together at their non-hinge, overlapped lugs. The same construction can be employed with larger couplings which are made of a number of arcuate sections that are secured together, end to end, with similar hook and loop hinges and with a bolt connecting one set of lugs.

The coupling segments are conventionally formed in a U-shaped cross section and a suitable gasket, such as a rubber-like material in a ring shape, is inserted within the interior channel formed by the U-shaped segments, for encircling and sealing against the adjacent pipe ends. Conventionally, the inner edges of the legs defining the U-shaped cross sections of the segments, are formed to slip into grooves provided adjacent the ends of the pipes to hold the pipes within the coupling.

In this type of construction, it is desirable to provide a hinge construction which permits rapid hinging connection between the segments whenever desired, whether in a shop during manufacturing of the product or at a job site or the like, rapidly, with minimal labor. Particularly, on the job site, the workmen should be able to assemble the segments rapidly, if they are not pre-assembled, and to be able to depend upon the segments remaining together even though they may be carelessly handled or manipulated at different angles while they are assembled upon the pipes. That is, since the couplings are typically arranged around pipes which may be arranged at different angles relative to the horizontal, it is desirable to insure that the hinge connection remains intact despite movement of the coupling at various angles while the segments are hinged apart. Thus, the invention herein relates to an improved hinge construction by which the segments may be rapidly, manually assembled and the hinged together segments will not come apart, despite careless or rough handling, unless they're deliberately separated with a suitable hand tool, such as a screw driver.

SUMMARY OF INVENTION

This invention contemplates a coupling formed of arcuate segments which are hingedly connected together at adjacent ends by means of a U-shaped loop formed on the end of one segment and a hook integrally formed on the corresponding opposite segment end, with the loop forming an elongated, relatively narrow, opening through which the hook, which is of corresponding cross sectional shape, is loosely inserted. The hook is provided with a bump which prevents the hook from being accidentally disengaged from the loop opening. However, the hook may be manually angled, relative to the axis of a coupling and the opening, so that its opposite edges fit into slight depressions that are formed in the corresponding adjacent wall surface of the segment and the loop. Thus, twisting of the relatively loose hook within the opening clears the bump through the loop for removal of the hook therefrom. However, a ring-like washer is inserted around the loop, adjacent the hook, to prevent the twisting, disengaging action of the hook unless the washer or ring is manually pulled out. Thus, the segments can be joined together by inserting the hook within the loop and will remain together until the ring is manually removed and the hook is twisted and turned deliberately, relative to the loop for removal.

One object of this invention is to provide a simple, inexpensive hinge construction which permits rapid manual assembly of the coupling segments together, in the field or in the factory, and prohibits disassembly while the coupling is manipulated at different angles and in different places, unless a fastening ring is deliberately removed, such as by a screw driver, and the hinge is deliberately manually manipulated for disengaging the parts thereof.

Still a further object of this invention is to provide an inexpensive coupling segment hinge connection which can be rapidly and manually assembled and, conversely, manually disassembled only when desired.

Yet another object of this invention is to provide a hinge construction for pipe couplings of the type which couple and seal together pipe ends, which hinge can be assembled and disassembled rapidly, when desired, so that the segments forming the coupling may be stored and handled separately for assembly on the job site, without the use of tools, or can be preassembled, as desired.

These and other objects and advantages of this invention will become apparent upon reading the following description of which the attached drawings form a part.

DESCRIPTION OF DRAWINGS

FIG. 1 is an elevational view of an assembled coupling.

FIG. 2 is a cross sectional view of the coupling, taken as if in the direction of arrows 2—2 of FIG. 1, showing the coupling mounted upon and connecting together the adjacent ends of a pair of pipes.

FIG. 3 is an elevational view, partially in cross section, showing the assembled coupling.

FIG. 4 is an elevational view, partially in cross section, showing the coupling segments swung apart around the hinge.

FIG. 5 is a front elevational view, partially in cross section, taken in the direction of arrows 5—5 of FIG. 1.

FIG. 6 is an elevational view of the spacer ring.

FIG. 7 is a plan view of the coupling upper segment.

FIG. 8 is a fragmentary view, partially in cross section, showing the disassembled hinge parts.

FIG. 9 is a schematic view showing the angling or twisting of the hook relative to the hinge loop for disassembly.

DETAILED DESCRIPTION

As illustrated in FIG. 2, the coupling 10 is used to connect the adjacent ends of pipes 11 and 12. Each of the pipes is provided with a groove 13 near its end. This general type of coupling, which is utilized for connecting grooved pipe ends, is conventional.

The coupling is formed of an upper, arcuate or semicircular segment 15 and a lower, arcuate or semi-circular segment 16. The segments are joined together to form the circular, ring-like, coupling housing. The segments are of substantially uniform, U-shaped cross section having an outer wall or base with inwardly directed legs 19. The inner, peripheral edges of the legs form keys 20 for interlocking within the grooves 13 in the pipe ends. A rubber-like gasket 22, which is generally U-shaped in cross section, is arranged within the coupling. The free edges of the legs of the gasket (see FIG. 2) are sealed against the pipe end portions.

As shown in FIGS. 3 and 4, the lower segment 16 is provided with a radially extending, U-shaped in cross section lug 25. The lug is formed with a base portion 26 and integral upwardly extending legs 27. A bolt hole 28 is formed in the base 26.

The upper segment 15 is provided with an inverted, U-shaped lug 30. This lug is formed with a base 31 and integral downwardly extending legs 32. An elongated radially outwardly opening notch 33 is formed in the base.

The two lugs are arranged to overlap, with their legs in contact, edge to edge. Thus, a bolt 34 is arranged with its shaft portion 35 extending through the bolt hole 28 in the lower lug 25 and into the notch 33 in the upper lug 30. A suitable nut 36 secures the bolt in place to hold the two lugs tightly together. Because of the open ended notch 33 in the upper lug, the bolt may be loosened and pushed radially outwardly of the upper lug for disengaging the two lugs. Conversely, the bolt is pushed radially inward through the notch 33 for securing the lugs together.

The two segments are hinged together at their opposite, adjacent ends. The hinge includes a U-shaped loop 40 which is horizontally arranged in the drawings. The loop includes spaced apart side legs 41, which are integral with the wall of the upper segment, and a base 42 interconnecting the legs 41. The base forms a hinge axle.

A depression or notch 43 is formed in the axle at one of the side legs 41. Similarly, a depression or notch 44 is formed in the wall 18 of the upper segment at the opposite leg. (See FIGS. 7 and 8). In addition, an integral stop flange 45 is formed on the lower edge of the axle (See FIGS. 3 and 5).

The lower segment 16 is provided with an inverted, U-shaped hook 48 which fits through the opening defined by the loop side legs 41, the base or axle 42 and the wall of the upper segment. The hook is provided with a down turned forward tip or flange 49 which fits over the axle 42.

The hook is provided with a bump or projection 50 along its upper surface, near the area where the depression 43 is formed in the axle. The hook fixed leg 51, which is integral with the wall of the lower segment, is arranged for engaging and stopping the depending stop flange 45 which extends along the lower edge of the axle.

The hook is generally rectangular in cross section to correspond to the rectangular opening formed by the U-shaped hinge loop 40. But, the hook is of slightly smaller width and length than the loop openings. Thus, the hook is relatively loose within the hinge loop. To prevent the hinge loop from shifting in an axially direction relative to the axis of the coupling, a split spacer ring 53 (see FIGS. 5, 6 and 8) is arranged between a side surface of the hook and the adjacent surface of one of the side legs 41 defining the loop. The spacer ring is preferably formed as a flat, C-shaped, split or open washer-like plate made of a smooth plastic material which is resiliently flexible. Thus, the spacer is provided with an opening or split 54 for pushing the spacer around the axle. The inner peripheral edge defining the inner opening in the ring, is shaped to snugly fit around the axle 42, including fitting around the depending stop flange 45. Preferably, the edges of the ring, at the split, and provided with inwardly extending tabs 55 and 56 to snugly fit around the adjacent axle portions.

The spacer ring 53 is provided with an enlarged, outwardly extending projection 57, which may be shaped like a circular knob. This projection engages the side leg 41 of the loop (see FIG. 5).

In operation, the two segments may be stored and handled as two separate units which may be assembled together at the job site. Alternatively, they may be pre-assembled either in the manufacturing plant or at any stage up to use on the job. For assembly, the hook is inserted through the loop. Thus, when the upper segment is held horizontally, the lower segment dangles downwardly and is ready to be swung upwards to encircle the adjacent ends of a pair of pipes. Significantly, the projection or bump 50 on the upper surface of the hook engages against the adjacent wall portion of the upper segment to limit the angular separation of two segments. In addition, the bump or projection 50 will prevent the two segments from separating during manipulation of the open coupling, regardless of the angle at which the coupling is held. In order to keep the hook in place within the loop, the spacer ring 53 is inserted at one side of the hook. The spacer ring being slightly resilient, may be pushed manually into place. Conversely, it may be pryed out of place with a screw driver or some other simple hand tool.

In order to insert or remove the hook from the opening formed in the hinge loop 40, the hook is twisted or turned at an angle, as schematically illustrated in FIG. 9. Thus, one end corner portion of the hook (shown in dotted lines in FIG. 9) enters the depression 43 in the notch while the opposite corner portion of the hook enters the depression 44 in the wall of the upper segment. This clears the bump 50 for movement through the opening in the loop 40. The hook is tipped at an angle relative to the axis of the coupling by twisting the two segments relative to each other. When the hook is returned to its normal axially aligned position, the opposite corners are removed from the respective depressions and the bump 50 prevents the hook from being removed from the loop.

The simple hook construction prevents the hook from disengaging from its loop unless the user deliberately removes the spacer ring and twists the two segments relative to each other. This makes it possible to handle the coupling with one hand. That is, a workman may position the coupling over an adjacent pair of pipe ends and then close the two segments around the pipe ends, using only one hand. Then, the workman is able to use his other hand to push the bolt into position in the upper lug notch and to tighten the nut for firmly securing the coupling in place.

Although the coupling illustrated is formed of two segments, more than two segments may be utilized where a large size coupling is required. Thus, the coupling could be formed of a chain of three or four or more segments, with each segment connected to the next one by a hook and loop arrangement similar to that described above. One end segment may be provided with a lug similar to the lower segment lug 25 and the opposite end segment may be provided with an upper segment lug 39 similar to that described. A single bolt, passing through the two overlapped lugs will lock the coupling in place around the adjacent pipe ends.

This invention may be further developed within the scope of the following claims. Thus, the foregoing description should be read as being illustrative of an operative embodiment of this invention and not in a strictly limiting sense.

Having fully described an operative embodiment of this invention, I now claim:

1. A pipe coupling hinge for hingedly connecting adjacent ends of arcuate pipe coupling segments having relatively narrow, band-like, arcuate walls, which segments are aligned and connected together at adjacent ends to form a generally circular casing for surrounding and coupling adjacent ends of a pair of pipes, with an end of one segment having a hinge loop and the corresponding end of the adjacent segment having a hinge hook engaged with said loop for providing a hinge connection between the segments and fastening means at the ends of said segments opposite said adjacent ends, the improvement comprising:

said hinge loop being generally U-shaped and formed of a pair of spaced apart side legs which are integral with, and extend radially outwardly from an adjacent segment wall, and an integral base forming a substantially straight hinge axle spaced outwardly of the segment wall and substantially parallel to the casing axis to provide an elongated, generally rectangular slot-like opening defined by said legs and base and the segment wall;

said hook being generally U-shaped with a fixed leg integral with said corresponding end and a free leg and a base for fitting through the loop opening and overlapping the axle, with the hook being generally rectangular in cross-section and substantially filling, but being slightly smaller in dimensions than the loop opening, so that the hinge is loose relative to the loop opening;

an outwardly extending bump formed on the exterior of the hook base at one side thereof, so that the bump is located near one of the legs forming the loop;

a depression formed in the axle adjacent said one leg and opening towards the segment wall portion which is overlapped by the axle;

and said hook being sufficiently loose relative to the loop opening, so that one of the segments may be manually moved relative to the other and relative to the casing axis, to fit a corner portion of the hook within the depression in the axle for clearing the bump through the loop opening to permit disengaging the hook from the loop, and with the bump being of sufficient height to normally engage the adjacent segment wall portion defining the loop when the hook is moved relative to the loop, and to otherwise prevent separation of the hook from the loop, when the segments are in axial alignment;

whereby said segments may be stored and handled separately and may be assembled together by interengaging the hook and loop thereof;

2. A pipe coupling hinge as defined in claim 1, and a second depression formed in the segment wall portion that is overlapped by the axle, and is adjacent the other leg of the loop, so that the two depressions are aligned with each other adjacent opposite corners of the rectangular loop openings;

and with the opposite corner portion of the hook fitting within the second depression in the segment wall simultaneously to fitting said first mentioned corner portion into the first mentioned depression.

3. A pipe coupling hinge as defined in claim 2, wherein said fastening means include radially outwardly extending integral fastening lugs formed on the opposite ends of the segments, with the fastening lugs normally being overlapped and a releasable fastening bolt means extending through them for tightly fastening the hinged segments together for coupling around the pipe ends.

4. A pipe coupling hinge as defined in claim 2, and with the edge of the axle which is opposite to the edge upon which the hook base engages, being formed as a stop shoulder for engaging against the hook fixed leg when the segments are hinged apart a predetermined distance to limit the hinging action;

whereby the coupling segments may be hingedly separated for positioning one segment upon a pair of adjacent pipe ends, while the segments are connected together as a unit, and then the other segment may be hingedly swung into its coupling position for encircling and coupling the pipe ends.

5. A pipe coupling as defined in claim 4, wherein said fastening means include radially outwardly extending integral, fastening lugs formed on the opposite ends of the segments, with the fastening lugs normally being overlapped;

and with one of the lugs having a bolt hole through which a bolt is loosely inserted, and the opposite lug having a radially outwardly opening notch for receiving the bolt through the notch and for disengaging the bolt by moving it radially outwardly of the notch;

and a nut mounted upon the bolt for releasably securing the lugs together when the segments are aligned into coupling position.

6. A pipe coupling as defined in claim 1, and including a flat, split ring fitted around the axle between one loop side leg and the adjacent surface of the hook, with the ring having sufficient thickness to normally limit movement of the hook within the opening in directions angular to the direction of the axis of the coupling.

7. A pipe coupling as defined in claim 6, and including a laterally extending projection formed on the surface of the ring which is nearest to the adjacent loop leg for engaging said loop leg.

8. A pipe coupling as defined in claim 7, and said ring being roughly C-shaped and having an interior edge with said interior edge shaped to closely correspond to the cross sectional shape of the loop base for closely encircling and engaging with the loop base.

9. A pipe coupling as defined in claim 8, and said ring being formed of a relatively smooth, resiliently flexible plastic material, whereby the ring may be inserted over the axle and into its position upon the axle and manually pried therefrom when desired.

* * * * *